United States Patent
Pegg

(10) Patent No.: US 10,502,157 B2
(45) Date of Patent: Dec. 10, 2019

(54) MACHINE WITH REDUCED CYLINDER FRICTION

(71) Applicant: Ford Global Technologies, LLC, Dearborn, MI (US)

(72) Inventor: Ian Graham Pegg, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 15/383,769

(22) Filed: Dec. 19, 2016

(65) Prior Publication Data

US 2017/0211506 A1   Jul. 27, 2017

(30) Foreign Application Priority Data

Jan. 27, 2016   (GB) .................................. 1601512.5

(51) Int. Cl.
| F02F 1/00 | (2006.01) |
| F02F 3/00 | (2006.01) |
| F02F 1/20 | (2006.01) |
| F16J 10/04 | (2006.01) |

(52) U.S. Cl.
CPC ............... *F02F 1/004* (2013.01); *F02F 1/20* (2013.01); *F02F 3/00* (2013.01); *F16J 10/04* (2013.01)

(58) Field of Classification Search
CPC ........ F16J 10/02; F16J 1/08; F16J 9/12; F02F 1/20; F02F 1/004; F04B 39/122; F04B 39/126

See application file for complete search history.

(56) References Cited

U.S. PATENT DOCUMENTS

| 6,041,749 A | 3/2000 | Lübbing et al. |
| 6,253,724 B1 | 7/2001 | Han |
| 9,341,267 B2 * | 5/2016 | Kim .......................... F02F 1/20 |
| 2012/0186561 A1 | 7/2012 | Bethel et al. |
| 2013/0220113 A1 | 8/2013 | Kim |
| 2014/0345453 A1 | 11/2014 | Oh et al. |

FOREIGN PATENT DOCUMENTS

| DE | 10360148 A1 | 7/2005 |
| GB | 2431976 A | 5/2007 |
| GB | 2540209 A | 1/2017 |

OTHER PUBLICATIONS

Examination Report of Great Britain Patent Application No. 1601512.5, dated Jun. 17, 2016, United Kingdom Intellectual Property Office, 8 pages.

(Continued)

*Primary Examiner* — Abiy Teka
(74) *Attorney, Agent, or Firm* — Geoffrey Brumbaugh McCoy Russell LLP

(57) ABSTRACT

A machine having a cylinder, the configuration of the machine being such that a body portion of a piston of the machine periodically engages an inner surface of the cylinder during operation of the machine, this engagement defining a contact zone between the body portion of the piston and the inner surface of the cylinder, the inner surface of the cylinder having an enhanced bearing region comprising one or more recesses indented into the inner surface, the enhanced bearing region being smaller than the inner surface of the cylinder and being substantially centered on the contact zone.

20 Claims, 4 Drawing Sheets

(56) References Cited

OTHER PUBLICATIONS

European Patent Office, Extended European Search Report Issued in Application No. 17152046.3, dated Jul. 3, 2017, Germany, 8 pages.
Intellectual Property Office of Great Britain, Examination Report Issued in Application No. GB1601512.5, dated Mar. 21, 2017, South Wales, 5 pages.

* cited by examiner

MACHINE WITH REDUCED CYLINDER FRICTION

CROSS REFERENCE TO RELATED APPLICATION

The present application claims priority to Great Britain Patent Application No. 1601512.5, filed on Jan. 27, 2016. The entire contents of the above-referenced application are hereby incorporated by reference in its entirety for all purposes.

BACKGROUND/SUMMARY

This disclosure relates to a machine, such as a linear actuator or a rotary machine, having one or more cylinders each having an inner surface comprising a one or more recesses indented into the inner surface, and in particular relates to an inner surface of a cylinder having a plurality of recesses provided only in predetermined regions of the cylinder bore.

The term "rotary machine" is intended to encompass reciprocating machines such as internal combustion engines, compressors and vacuum pumps, as well as machines with rotating components but no reciprocating parts.

An internal combustion engine typically has one or more reciprocating pistons which are lubricated to reduce the friction as the piston slides within a cylinder bore. Lubricated sliding contacts, such as between the piston rings of a piston and an inner surface of the cylinder bore, have frictional losses due to the shear forces generated in the lubricant, contact between surface asperities, and boundary contacts caused by additives in the lubricant.

In some situations there is an operational clearance between a circumferential surface of the piston and the inner surface of the cylinder bore, and it is desirable to maintain contact only between the inner surface of the cylinder bore and the piston rings. As a result of such a configuration, the body of the piston can move, or rock, from side to side during operation, for example when the piston moves between an upward and a downward stroke, and vice versa.

Such movement can cause the piston to damage the inner surface of the cylinder bore, for example at the point where the piston "slaps" over at top dead center of the piston stroke. It is desirable, therefore, to mitigate damage to the inner surface of the cylinder bore.

According to an aspect of the present disclosure there is provided a machine, for example an engine, the machine being such that a grade point of the body portion of a piston of the machine periodically engages an inner surface of the cylinder during operation of the machine, this engagement defining a grade point contact zone between the body portion of the piston and the inner surface of the cylinder when the piston body rotates about an axis of a piston pin, the inner surface of the cylinder having a bearing region comprising one or more recesses indented into the inner surface, the bearing region being smaller than the inner surface of the cylinder and being substantially centered on the grade point contact zone.

In the context of the present disclosure, the term "engage" is intended to encompass two surfaces which are separated by a thin film of lubricant, as well as surfaces which come into direct physical contact.

The form, e.g. shape and/or size, of the bearing region may be defined, at least in part, by a first dimension in the direction of travel of the piston. The first dimension may be a function of a dimension of the body portion in the direction of travel of the piston. For example, the first dimension may be a function of a dimension of a piston skirt of the piston in the direction of travel of the piston. The ratio of the first dimension to the dimension of the body portion in the direction of travel of the piston may be in a range of approximately 1:2 to 1:1. For example, the piston skirt may be approximately 40 mm in length, i.e. in the direction of travel of the piston, and the first dimension, i.e. the length of the bearing region, may be in the range of approximately 20 mm to 40 mm. The first dimension may be approximately 30 mm.

The form of the bearing region may be defined, at least in part, by a second dimension in the circumferential direction of the piston. The second dimension may be a function of a dimension of the body portion in the circumferential direction of the piston. For example, the second dimension may be a function of a dimension of a piston skirt of the piston in the circumferential direction of the piston. The ratio of the second dimension to the dimension of the body portion in the circumferential direction may be in a range of approximately 1:4 to 1:2. For example, the piston skirt may have a circumferential dimension, i.e. an arc length, of approximately 60 mm, and the second dimension, i.e. circumferential dimension of the bearing region, may be in the range of approximately 15 mm to 30 mm. The second dimension may be approximately 22 mm.

The inner surface of the cylinder and at least a portion of a circumferential surface of the piston body may be parallel in the contact zone, for example during operation of the machine. The piston body and/or the inner surface may be configured to deform elastically under loading. The portion of the piston body that deforms elastically under loading and engages the inner surface of the cylinder may define an elastic contact zone between the inner surface of the cylinder and the circumferential surface of the piston body. The dimension of the contact zone in the direction of travel of the piston may be defined by a dimension, for example the axial length, of the elastically deformed portion of the piston body. The circumferential surface of the piston body and the inner surface of the cylinder may be parallel as a result of the elastic deformation of the piston body and/or the inner surface. The dimension of the recess in the direction of travel of the piston may be less than the dimension of the elastically deformed portion of the piston body in the direction of travel of the piston. The first dimension may be a function of the dimension of the elastically deformed portion of the body portion of the piston in the direction of travel of the piston. The first dimension may be a function of the dimension of the elastically deformed portion of the inner surface of the cylinder in the direction of travel of the piston. The second dimension may be a function of the dimension of the elastically deformed portion of the body portion of the piston in the circumferential direction of the piston. The second dimension may be a function of the dimension of the elastically deformed portion of the inner surface of the cylinder in the circumferential direction of the piston.

The configuration of the contact zone may depend on the operational state of the engine. For example, at a high engine output the forces acting on the piston body may be higher than the forces acting on the piston body at a lower engine output. As such the form of the contact zone, e.g. the elastic contact zone, may vary depending on the output of the engine. The form of the elastic contact zone may be dependent upon the axial and/or radial loading of the piston body against the inner surface, the form of the circumferential surface of the piston body, and/or the material properties, e.g. the Young's modulus, of the respective surfaces.

A lubricant may be used to reduce the friction between the piston body and the inner surface of the cylinder. A lubricant film may be formed in the contact zone between the circumferential surface of the piston body and the inner surface of the cylinder during operation of the engine. The lubricant film in between at least a portion of the circumferential surface and the inner surface may have a film thickness that is substantially constant in the direction of travel of the piston during operation of the machine. For example, the film thickness of the lubricant film may be substantially constant where the circumferential surface of the piston body and the inner surface of the cylinder are parallel. The portion of the lubricant film that has a substantially constant film thickness may have a dimension in the direction of travel of the piston, for example an axial dimension that defines the overall length of the portion of the lubricant film that has a substantially constant film thickness. The dimension of the recess in the direction of travel of the piston may be less than the dimension of the portion of the lubricant film that has a substantially constant film thickness in the direction of travel of the piston.

The inner surface may comprise a top bearing region having a plurality of recesses indented into the inner surface. The top bearing region may be provided on the thrust side of the cylinder. The top bearing region may extend towards the bottom end of the cylinder away from a contact zone between a bottom piston ring and the inner surface when the piston is at top dead center of a stroke.

The inner surface may comprise a bottom bearing region having a plurality of recesses indented into the inner surface. The bottom bearing region may be provided on the anti-thrust side of the cylinder. The bottom bearing region may extend towards the top end of the cylinder away from a contact zone between a top piston ring and the inner surface when the piston is at bottom dead center of the stroke of the piston.

The inner surface may be an inner surface of a bore of a cylinder block. The inner surface may be an inner surface of a cylinder liner.

The recesses may be configured to retain a fluid, for example each recess may comprise a pocket configured to trap the fluid in the inner surface. The recesses may be configured to slow down the rate at which fluid drains away from the top and/or bottom bearing regions of the inner surface. The top bearing region and the bottom bearing region may be separated by a middle region having no recesses indented into the inner surface. The top bearing region and the bottom bearing region may be spaced apart, for example by the middle region, in the direction of travel of the piston.

The top bearing region may comprise a plurality of recesses extending partially around the full circumference of the inner surface. The bottom bearing region may comprise a plurality of recesses extending partially around the full circumference of the inner surface. The top bearing region may have an axial dimension in the direction of travel of the piston. The bottom bearing region may have an axial dimension in the direction of travel of the piston. The middle region may have an axial dimension in the direction of travel of the piston. The axial dimension of the middle band may be greater than the axial dimension of the top and/or bottom bearing regions.

The bearing region, for example the top and/or bottom bearing regions, may be elliptical in shape. However, the bearing region may have any appropriate shape, such as a diamond, a square, a rectangle or a triangle, amongst others.

The top and bottom bearing regions may be similar in form. The top and bottom bearing regions may be different in form.

The bearing region may have a center point located in a radial plane of the piston when the piston is at top dead center. The radial plane may be parallel to the axis of rotation of a piston pin of the piston. The center point may be located in a radial plane within the range of approximately 0 to 20 mm from a bottom edge of the body portion of the piston, when the piston is at top dead center. The center point may be located in a radial plane located at approximately 16 mm from the bottom edge of the body portion of the piston, when the piston is at top dead center. The radial plane may be located at a gauge point of the piston.

The bearing region may have a center point located in an axial plane of the piston when the piston is at top dead center. The axial plane may be perpendicular to a rotational axis of a piston pin of the piston and/or a rotational axis of a crankshaft of the machine. The axial plane may be a mid plane of the piston, for example the axial plane may be coincident with the mid point of the rotational axis of the piston about the piston pin.

The bearing region may have a center point located at or near to a point on the inner surface that corresponds to a grade point of the piston when the piston is at top dead center or bottom dead center. In the context of the present disclosure, the term "grade point" refers to the portion of the circumferential surface of the piston body that first engages the inner surface of the cylinder when the piston rotates about the axis of a piston pin, for example as the piston rocks at top dead center or bottom dead center. The grade point may correspond to the largest radial diameter of the piston body. The piston body may have a radial dimension in a direction perpendicular to the piston pin that is larger than a radial dimension in a direction parallel to the piston pin. The piston body may taper such that the diameter at a lower portion, e.g. a piston skirt, of the piston body is larger than the diameter of an upper portion, e.g. a piston head, of the piston body. In this manner, the operational clearance between the inner surface of the cylinder and the lower portion of the piston body may be less than the operational clearance between the inner surface of the cylinder and the upper portion of the piston body, for example when the engine is cold.

The shape, for example an axial and/or radial cross-sectional shape, of the piston may be selected to compensate for expansion of the piston and/or the physical forces applied to the piston during operation of the engine. During operation of the engine, the upper portion of the piston body may expand by a greater amount than the lower portion of the piston body as the engine temperature rises, since the upper portion of the piston body is closer the combustion of the fuel in the cylinder. The difference in the operational clearance between the inner surface of the cylinder and the lower portion of the piston body, and the operational clearance between the inner surface of the cylinder and the upper portion of the piston body may decrease as the temperature of the engine increases, for example as the upper portion of the piston expands. As a result, the circumferential surface of the piston body may become more parallel with the inner surface of the cylinder as the engine heats up. The risk of damage to the inner surface of the cylinder caused by piston slap may be higher during a warm-up phase of the engine when the engine is cooler and operational clearances are larger, which allow the piston to rock by a greater amount. It is advantageous, therefore, to provide the enhanced bearing region in one or more areas of the inner surface of the cylinder that may become scuffed as a result of the contact with the body portion of the piston.

The recesses may be arranged into rows that extend circumferentially around the inner surface. The recesses of each row may have a circumferential spacing between adjacent recesses. The ratio of the dimension of the recess in the circumferential direction to the dimension of the circumferential spacing may be approximately 2:1. One of the rows may be offset from another of the rows in the circumferential direction by an offset distance. The ratio of the dimension of the recess in the circumferential direction to the dimension of the offset distance may be approximately 2:1. The rows may be adjacent.

There is provided a vehicle comprising one or more of the above mentioned machines.

According to another aspect of the present disclosure there is provided a method of forming a machine having one or more cylinders, the configuration of the machine being such that a grade point of a body portion of a piston of the machine periodically engages an inner surface of the cylinder during operation of the machine, this engagement defining a grade point contact zone between the inner surface of the cylinder and the body portion of the piston when the piston body rotates about an axis of a piston pin, the inner surface having an enhanced bearing region comprising one or more recesses indented into the inner surface, the enhanced bearing region being smaller than the inner surface, the method comprising:

determining the location of the grade point contact zone; and providing the enhanced bearing region in a region of the inner surface that is substantially centered on the grade point contact zone.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

It is desirable to reduce the friction as an engine piston reciprocates in a cylinder in order to increase the efficiency of the engine and reduce wear between engine components. The friction between the components may be determined by a number of factors, which include the operational parameters of the engine and the configuration of each of the sliding surfaces. For example, the frictional coefficient between sliding components may be determined using the Stribeck curve, which is used to categorize the frictional properties between two surfaces as a function of the viscosity of the lubricant and the relative speed between the components per unit load. As such, friction may be minimized by operating at the minimum point on the Stribeck curve, which defines the transition between hydrodynamic lubrication and mixed lubrication. However, it is difficult to maintain operation at the minimum point on the Stribeck curve across the full piston stroke as a result of the low relative speed between the piston and the cylinder at the extremes of the range of movement of the piston.

Figure 1:
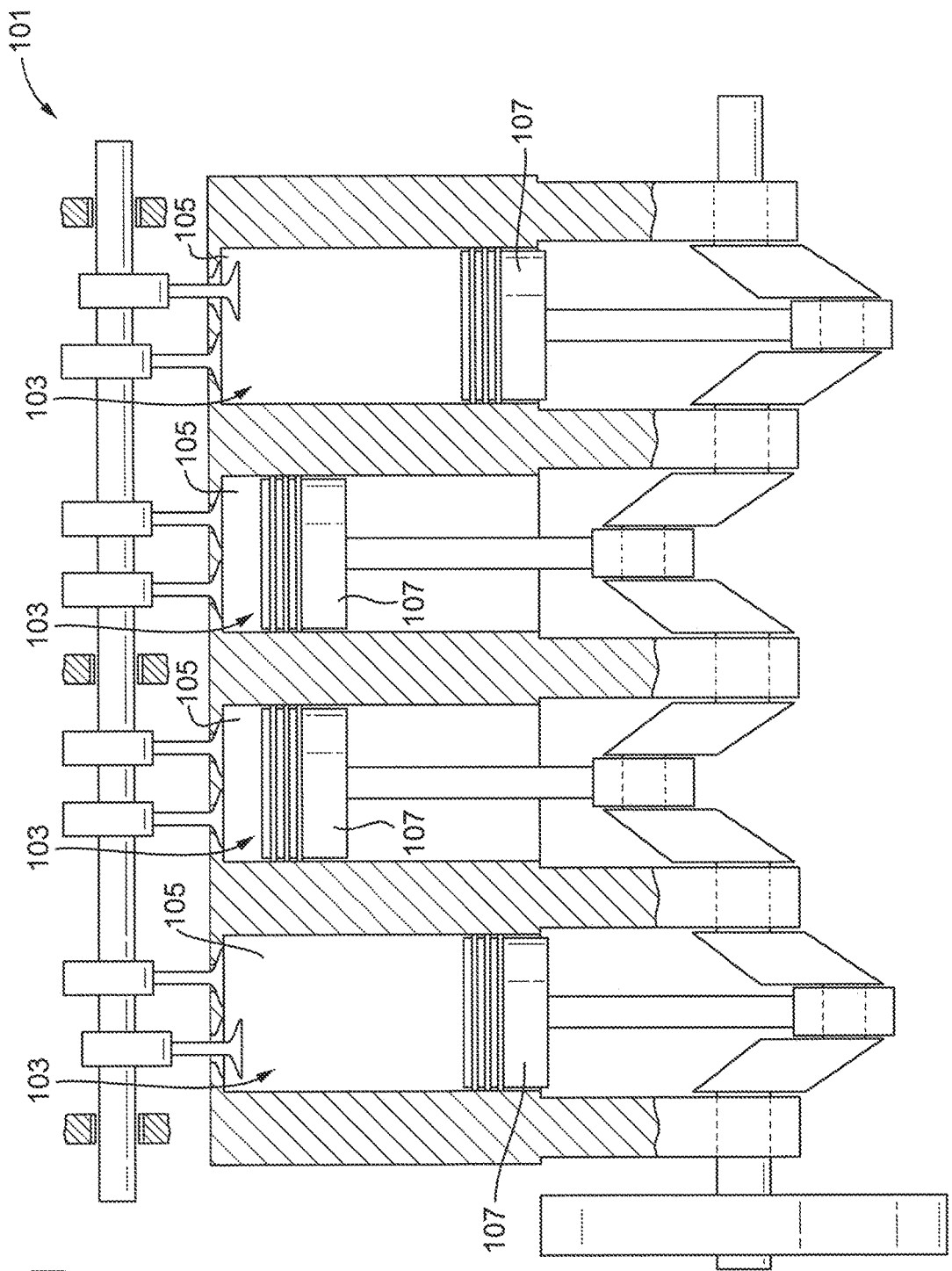
FIG. 1 shows a partial cross section through an engine.

FIG. 1 shows a simplified cross-section of a machine in the form of an engine 101. The engine 101 is a four-cylinder engine having an overhead camshaft. However, the engine 101 may be any type of engine, for example a single overhead camshaft (SOHC) engine, a double overhead camshaft (DOHC) engine, an overhead valve (OHV) engine, or other appropriate type of engine. Whilst the engine 101 shown in FIG. 1 is a four-cylinder engine, the engine 101 may comprise any appropriate number of cylinders 103, for example the engine 101 may be a three-cylinder engine, a six-cylinder engine or an eight-cylinder engine. The cylinders 103 may be arranged in an appropriate configuration, such as in-line, horizontally opposed or V-form.

Figure 2:
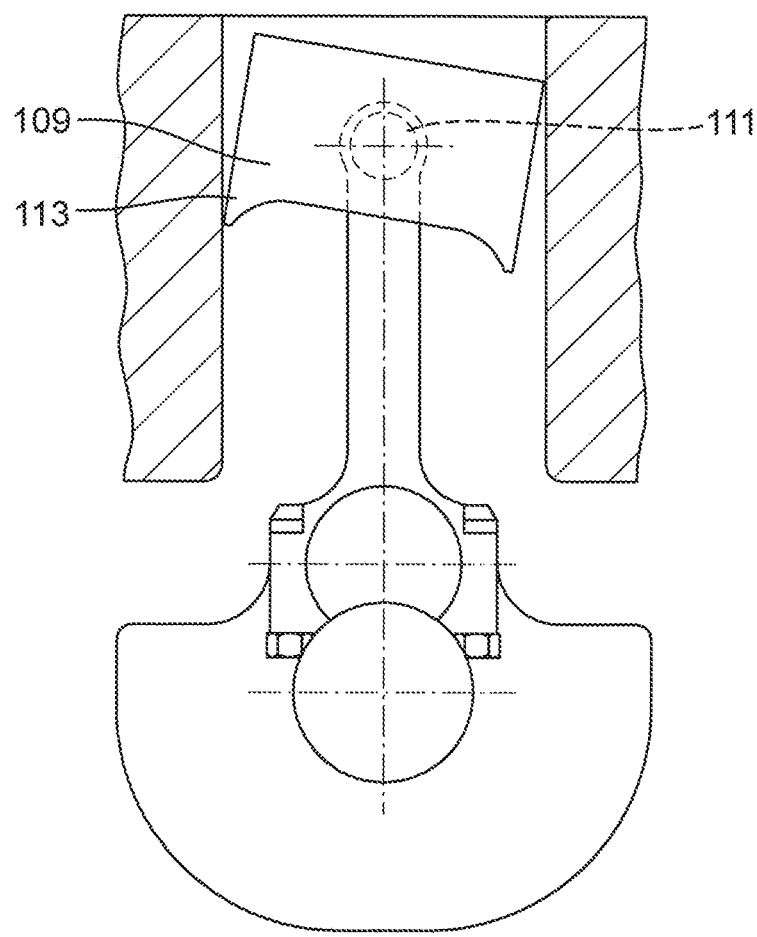
FIG. 2 shows a piston of an engine at top dead center in a cylinder of the engine.
Figure 3:
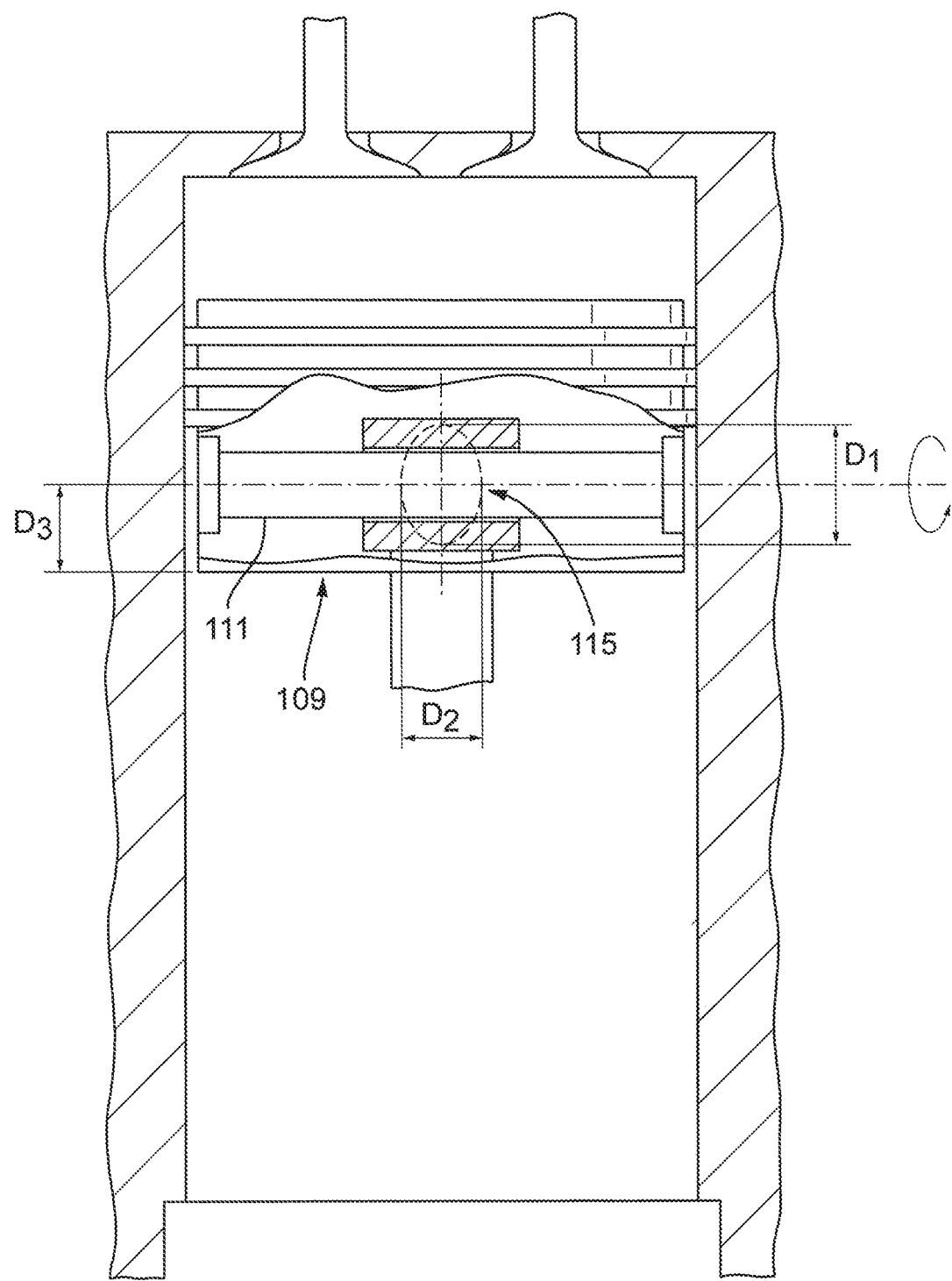
FIG. 3 shows a detailed view of the piston at top dead center.

Each of the cylinders 103 comprises an inner surface 105 configured to engage the piston rings of an engine piston 107. The inner surface 105 may be an inner surface of a cylinder bore formed directly into a cylinder block of the engine 101, as shown in FIGS. 1 to 3. Alternatively, the inner surface 105 may be an inner surface of a cylinder liner that is assembled into the cylinder block.

During operation of the engine 101, each of the pistons 107 reciprocates within the cylinder 103 between a top dead center position and a bottom dead center position. In the context of the present disclosure, the term "top dead center" refers to the furthest point of a piston's travel, at which it changes from an upward stroke, i.e. away from a crankshaft of the engine 101, to a downward stroke, i.e. towards the crankshaft of the engine 101. The term "bottom dead center" refers to the furthest point of a piston's travel, at which it changes from a downward to an upward stroke. In a similar manner, the term "top" end of the cylinder 103 refers to an end of the cylinder 103 at which the piston 107 reaches top dead center, and the term "bottom" end of the cylinder 103 refers to an end of the cylinder 103 at which the piston 107 reaches bottom dead center.

As shown in FIGS. 1 to 3, it is known to provide an operational clearance between a body portion 109 of the piston 107 and the inner surface 105 of the cylinder 103, such that the only the piston rings contact the inner surface 105 as the piston 107 reciprocates in the cylinder 103. However, during certain periods of operation of the engine 101, the body portion 109, for example a piston skirt, can contact the inner surface 103. Such contact is brought about by movement, e.g. rocking, of the piston 107 about the rotational axis of a piston pin 111, which causes the piston skirt to "slap" against the inner surface 105. Piston slap can occur as the piston changes direction between an upward and a downward stroke of the piston, and vice versa. In particular, piston slap may cause damage to the inner surface 105 of the cylinder 103 at the extremes of the piston's travel.

FIG. 2 depicts an example of piston slap when the piston 107 is at top dead center, for example when the piston changes between a compression stroke and a power stroke. In such a situation, the piston 107 may be caused to rock about the rotational axis of the piston pin 111, which in turn causes the piston skirt 113 to contact the thrust side of the inner surface 105 of the cylinder 103. Although not shown in the drawings, it is understood that a similar action may occur when the piston 107 is at bottom dead center. For example, when the piston changes between an induction stroke and a compression stroke, the piston skirt 113 may contact the anti-thrust side of the inner surface 105 of the cylinder 103. As a result of the contact between the piston body 109 and the inner surface 105 of the cylinder, either or both of the components may become damaged. For example, the piston skirt 113 and/or the inner surface 105 of the cylinder 103 may become scuffed as a result of the periodic slapping of the piston skirt 113 against the cylinder bore, which can reduce the efficiency of the engine and the operational life of the engine.

In the arrangement shown in FIGS. 1 to 3, the piston body 109 comprises a circumferential surface, such as a circumferential surface of the piston skirt 113, that periodically contacts the inner surface 105 of the cylinder 103, as the piston 109 reciprocates within the cylinder 103, thereby defining a contact zone between the piston body 109 and the inner surface 105. It is understood that the contact zone between the piston body 109 and the inner surface 105 of the cylinder 103 may be defined by the portion of the circumferential surface of the piston body 109 that engages the inner surface 105 of the cylinder 103. It is also understood that the contact zone may move and/or change form as the piston 107 reciprocates in the cylinder 103, and/or as the operation of the engine changes. For example, the shape of the contact zone when the piston body 109 initially contacts the thrust side of the inner surface 105, e.g. at top dead center, may be different in form than shape of the contact zone when the piston body 109 initially contacts the anti-thrust side of the inner surface 105, e.g. at bottom dead center. Further, the shape of the contact zone may change dynamically as the piston moves away from a stationary position at top dead center or bottom dead center. It is desirable, therefore, to mitigate the damage to the piston body 109 and/or the inner surface 105 of the cylinder caused by the initial contact, e.g. impact, and/or the subsequent contact, e.g. sliding contact, between the two surfaces, for example within the contact zone.

During the operation of the engine 101, the linear speed of the piston 107 varies between a minimum speed, for example a zero speed when the piston is stationary relative to cylinder 103 at top dead center or bottom dead center, and a maximum speed as the piston 107 moves between top center and bottom dead center. As a result of the change in speed of the piston 107, the coefficient of friction between the piston body 109 and the inner surface 105 of the cylinder varies as the piston 107 travels within the cylinder bore.

In order to reduce the friction between the sliding components of the engine 101, such as the piston body 109 and the inner surface 105 of the cylinder, a lubricant may be used. The frictional coefficient between sliding components may be determined using the Stribeck curve, which is used to categorize the frictional properties between two surfaces as a function of the viscosity of the lubricant and the relative speed between the components per unit load. Friction may be minimized by operating at the minimum point on the Stribeck curve, which defines the tribological transition between hydrodynamic lubrication and mixed lubrication. However, it is difficult to maintain operation at the minimum point on the Stribeck curve across the full piston stroke as a result of the cyclical acceleration and deceleration of the piston 107 and as the piston body 109 slaps against the inner surface 105. For example, it is difficult to maintain hydrodynamic lubrication towards the top and bottom ends of the piston stroke owing to the low relative speeds between the piston 107 and the cylinder 103. In particular, at the ends of the travel of the piston 107, where the piston speed drops to zero, a lubricant film between the piston body 109 and the inner surface 105 of the cylinder 103 may be unable to form as there is no motion to establish a hydrodynamic lubricant film. The hydrodynamic film may begin to form in between the piston body 109 and the inner surface 105 as the piston body 109 begins to slide against the inner surface 105. As the hydrodynamic film forms, the pressure generated in the fluid acts to separate the two surfaces, and as a result the shape of the contact zone may change as the velocity of the piston increases.

The formation of the lubricant film is dependent on how fast the lubricant can drain away from a contact zone between the piston body 109 and the inner surface 105 of the cylinder 103. In order to help establish and/or maintain the lubricant film, the inner surface 105 of the cylinder 103 comprises one or more bearing regions 115 having a plurality of recesses 117 (cf. FIG. 4) indented into the inner surface 105. The recesses 117 may comprise any type opening in the inner surface 105 that enables a fluid, such as a lubricant, to be held within the opening as the piston body 109 engages and/or moves over the opening. For example, the recesses 117 may comprise a plurality of pockets shaped to retain lubricant, and/or decrease the rate at which lubricant drains away from the contact zone. The pockets may be of any shape, for example the pockets may be square, rectangular, circular or any other shape. In one arrangement, the pockets may be of a similar shape to each other. In another arrangement, the plurality of pockets may comprise a number of differently formed/shaped pockets, for example the plurality of pockets may comprise a number of round-bottomed pockets and a number of square-bottomed pockets that are configured to trap lubricant.

For the pockets to be effective, lubricant needs to be restricted from "leaking" out of the pocket as the piston 107 travels over it. This can be achieved by having an opening of the recess 117, for example in the direction of travel of the piston 107, that does not extend beyond the contact zone. Further, the configuration of the bearing region 115 in which the recesses 117 are provided may correspond exactly to the location of the contact zone. For example, the shape and/or size of the bearing region 115 in which the recesses 117 are provided may be provided such that the recesses 117 are able to trap lubricant in those areas of the inner surface that are at risk of becoming damaged as a result of the contact with the piston body 109. Under certain conditions, the contact zone may even cease to exist, for example as soon as when the relative speed between the piston body 109 and the inner surface 105 is sufficiently high to establish a hydrodynamic film. In this manner, it becomes unnecessary to provide recesses in areas other than those corresponding to the location of the contact zone in order to mitigate damage as a result of piston slap. Indeed, provision of recesses in those areas of the inner surface 105 that are at no risk of contacting the piston body 109, for example those areas facing an axial end of the piston pin and/or a mid-stroke region of the inner surface 105, may be detrimental to the operation of the engine. It may be appropriate, therefore, to provide the recesses 117 in only the bearing regions 115 of the inner surface 105 corresponding to the shape and/or the location of the contact zone, for example as function of the position of the piston 107 within the cylinder.

By trapping lubricant, it is possible to improve the lubrication regime and promote hydrodynamic of mixed lubrication rather than boundary lubrication. This minimizes contact between the piston body 109 and the inner surface 105 of the cylinder 103, for example in those regions of the inner surface 105 where the speed of the piston 107 approaches zero. However, in those regions of the inner surface 105 where the speed of the piston 107 is high, for example mid-stroke of the piston 107, the provision of recesses may act to increase the coefficient of friction as a hydrodynamic film may already be established due to the high relative speeds between the piston rings 107 and surface 105 of the cylinder 103. It may be desirable therefore to provide recesses in regions of the inner surface 105 only where the relative speeds between piston 107 and the inner surface 105 are at or near to zero, for example where the piston 107 is at or near to top dead center and bottom dead center of the piston stroke.

As such, it may be necessary to only provide the recesses 117 in those areas 115 of the inner surface 105 where the relative speed between the piston body 109 and the inner surface 105 is insufficient to establish or maintain a hydrodynamic film. For example, the bearing region 115 may be a bearing surface portion of the inner surface 105 that might engage the body portion 109. As mentioned above, the shape and/or location of the contact zone may change during operation of the engine. As such, the bearing surface portion of the inner surface may be configured to withstand contact with the piston body 109 in only those regions where a contact zone is established between the inner surface 105 and the piston body 105.

It is advantageous to configure the bearing region 115 of recesses 117 such that its size, shape and/or location directly relate to the location of the contact zone as function of the position of the piston 107 within the cylinder. The bearing region 115 in which the recesses 117 are provided may be defined, therefore, by a first dimension D1 in the direction of travel of the piston and by a second dimension D2 in the circumferential direction of the piston 107, such that the first and second dimensions define a discrete region of the inner surface in which recesses 117 are provided. In one arrangement, the first and/or second dimensions may be a function of the dimensions of the piston body 109, for example the piston skirt. For example, the first dimension may be a proportion of a dimension of the body portion 109 in the direction of travel of the piston 107 and the second dimension may be a proportion of a dimension of the body portion 109 in the circumferential direction of the piston 107. Depending on the configuration of the engine, for example the capacity of the cylinder 103, it may be advantageous to provide recesses in an area of the inner surface that has: i) a ratio of the first dimension to the dimension of the body portion in the direction of travel of the piston in a range of approximately 1:2 to 1:1; and/or ii) a ratio of the second dimension to the dimension of the body portion in the circumferential direction of the piston in a range of approximately 1:4 to 1:2. In the arrangement shown in FIG. 3, the bearing region 115 of the inner surface 103 that is provided with recesses 117 has a first dimension of approximately 30 mm and a second dimension of approximately 20 mm. it is understood, however, that the first and second dimensions may have any appropriate value.

In the arrangement shown in FIG. 3, the bearing region 115 is elliptical in shape. However, it is understood that the overall shape of the bearing region 115 may be any appropriate shape, such as circular, square, and/or trapezoidal, amongst others. The overall shape of the bearing region 115 may be determined by the shape and/or size of the contact zone as it moves across the inner surface 105 of the cylinder 103. For example, overall shape of the bearing region 115 may be a function of the signed area of the contact zone on the inner surface 105 of the cylinder over a stroke of the piston 107.

The position of the bearing region 115 on the inner surface 105 may be defined by reference to a portion of the piston body 109 and/or a portion of the cylinder 103. For example, the position of the bearing region 115 may be defined by center point of the bearing region 115. In the arrangement shown in FIG. 3, the bearing region 115 is an ellipse having a center point located in a radial plane of the piston 107 when the piston 109 is at top dead center. The radial plane is disposed at a distance D3 from a bottom edge of the body portion 109 of the piston 107, for example at a distance within the range of approximately 0 to 20 mm from the bottom edge of the body portion 109. In the particular arrangement shown in FIG. 3, the center point is located at approximately 16 mm from the bottom edge of the piston body 109. In this manner, since the height of the bearing region 115 is 30 mm in total, the bearing region 115 does not extend beyond the bottom edge of the body portion 109 when the piston 107 is at the top dead center. In other arrangements where the dimensions and/or the position of the bearing region 115 is different to the arrangement shown in FIG. 3, the bearing region 115 may extend beyond the bottom edge of the body portion 109, or indeed beyond any appropriate portion of the piston 107, for example beyond a top edge of the piston 107.

The center point of the bearing region 115 may be located in an axial plane of the piston 107 when the piston 107 top dead center. In the arrangements shown in FIG. 3, the center point of the bearing region 115 is located in an axial plane of the piston 107 that is perpendicular to and coincident with the midpoint of the rotational axis of the piston pin 111. Locating the bearing region 115 in this manner ensures that the recesses 117 are located symmetrically about an initial point of contact between the piston body 109 and the inner surface 105.

The cylinder 103 may be provided with a top bearing region configured to mitigate damage to the thrust side of the inner surface 105 and a bottom bearing region configured to mitigate damage to the anti-thrust side of the inner surface 105. The top bearing region may extend towards the bottom end of the cylinder 103 away from a contact zone between a bottom piston ring and the inner surface 105 of the cylinder 103 when the piston 107 is at top dead center of a stroke. The bottom bearing region may extend towards the top end of the cylinder 103 away from a contact zone between a top piston ring and the inner surface 105 of the cylinder 103 when the piston 107 is at bottom dead center of a stroke.

The inner surface 105 of the cylinder 103 may comprise a middle region in between the top and bottom bearing regions 115. The middle region may be proximate to the top and bottom bearing regions 115, or may be spaced apart and separate from the top and bearing regions 115. The middle region may provide a region of the inner surface 105 that has no recesses configured to trap fluid, for example the middle region of the inner surface 105 may be a smooth surface that separates the top and bottom bearing regions 115. The middle region may be provided across the majority of the inner surface 105, with the top and bottom bearing regions 115 being provided towards the top and bottom ends of the inner surface 105. The inner surface 105 of the cylinder 103 may, therefore, be configured to provide discrete regions that are configured to prevent the lubrication regime from transitioning into boundary lubrication from hydrodynamic lubrication in the regions of the piston stroke where the speed of the piston 109 approaches zero and the piston body 109 contacts the inner surface 105. In this manner, the coefficient of friction is minimized by maintaining a lubrication regime that operates near to the minimum of the Stribeck curve during operation of the engine.

Figure 4:
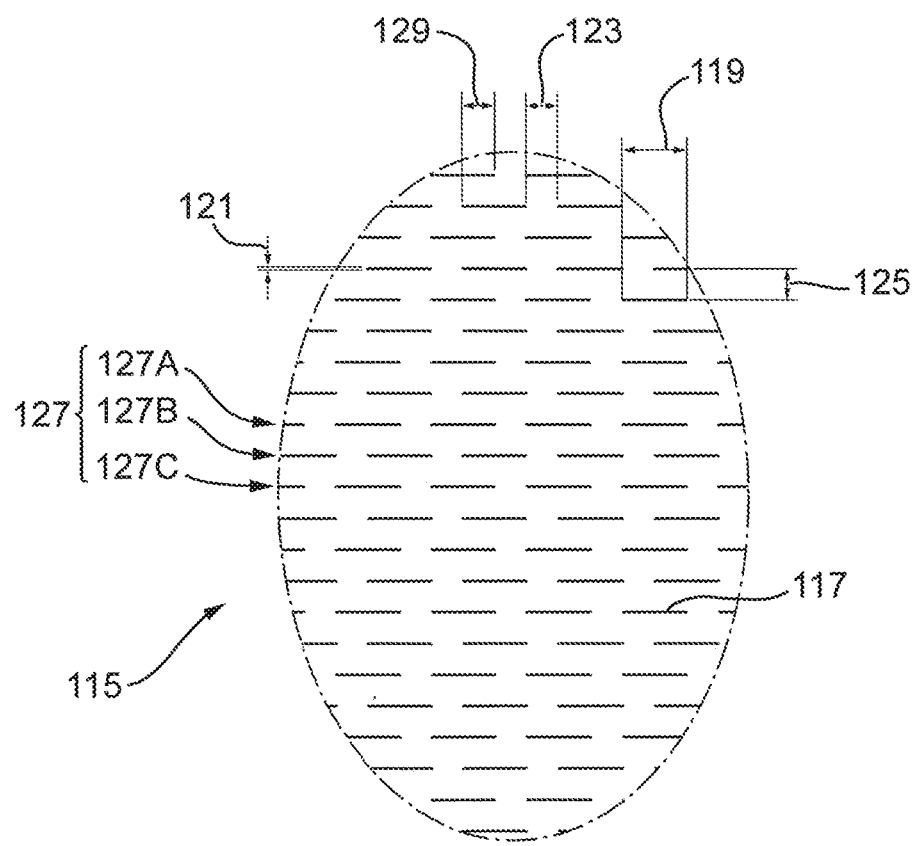
FIG. 4 shows a detailed view of a plurality of recesses.

FIG. 4 shows a detailed view of the plurality of recesses 117. In the arrangement of FIG. 4, each of the recesses 117 has the same configuration. However, as mentioned above, the plurality of recesses 117 may comprise any appropriate combination of differently shaped and/or sized recesses 117. In the arrangement shown in FIG. 4, the recesses 117 each have: a length 119, for example a circumferential length; a width 121, for example a width in the direction of travel of the piston 107; and a depth, for example a depth by which the recess 117 is indented into the inner surface 105. The length 119 of the recess 117 may be approximately 2 mm, or within the range of approximately 1 mm to 4 mm. The width 121 of the recess 119 may be approximately 60 µm or within the range of approximately 20 µm to 100 µm. The depth of the recess 117 may be approximately 20 µm or within the range of approximately 3 µm to 50 µm.

The recesses 117 may be spaced apart from each other in circumferential direction and/or in the direction of the travel of the piston, i.e. an axial direction. The recesses 117 may be spaced apart from each other in circumferential direction by a distance 123, which may be approximately 2 mm, or within the range of approximately 1 mm to 3 mm. The recesses 117 may be spaced apart from each other in axial direction by a distance 125, which may be approximately 2 mm, or within the range of approximately 1 mm to 3 mm.

In FIG. 4, the recesses 117 are arranged into rows 127 that are spaced apart in the axial direction by the distance 125. In each row, the recesses 117 are spaced apart from each other in circumferential direction by a distance 129, such that recesses 117 of each row 127 form a discontinuous ring around the circumference of the inner surface 105. Each row 127 may be staggered relative to an adjacent row 127. For example, each row 127 may have an angular offset about the longitudinal axis of the cylinder 103, such that the recesses 117 of adjacent rows 127A, 127B, 127C are spaced apart from each other in circumferential direction by a distance 129, which may be approximately 1 mm, or within the range of approximately 0.5 mm to 2 mm.

In the arrangement shown in FIG. 4, the ratio of the recess length 119 to the stagger distance 129 is approximately 2:1, and the ratio of the recess length 119 to the axial spacing 12 between rows 127 is approximately 2:1. In this manner, the recesses 117 are arranged such that the recess pattern repeats every third row. For example, any particular portion of the circumferential surface of the piston body will travel over the recesses 117 in the sequence of "recess, recess, no recess, etc." In this manner, the hydrodynamic effect of the lubricant retained in the recesses 117 is evenly distributed around the circumferential surface of the piston body 109.

The circumferential length 119 of each recess 117 may be selected to limit the amount of lubricant leakage where the circumferential surface of the body portion 109 does not entirely cover the opening of the recess 117. For example, where a recess 117 spans the boundary of the contact zone, the lubricant is not able to be contained in the recess 117. By limiting the circumferential length 119 of each recess 117, the volume of lubricant that may leak from a recess 117 is minimized whilst maintaining a sufficient volume of lubricant in the recess 117 to produce the desired lubricant supply.

FIGS. 1-4 show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example.

As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The invention claimed is:

1. A machine having a cylinder, wherein a grade point of a body portion of a piston of the machine periodically engages an inner surface of the cylinder during operation of the machine, the engagement defining a grade point contact zone between the body portion of the piston and the inner surface of the cylinder when the body portion of the piston rotates about an axis of a piston pin, the inner surface of the cylinder having a bearing region comprising one or more recesses indented into the inner surface of the cylinder, the bearing region being smaller than the inner surface of the cylinder, and wherein a center point of the bearing region is located in an axial plane of the piston that is perpendicular to and coincident with a midpoint of a rotational axis of the piston pin.

2. The machine according to claim 1, wherein the bearing region is defined by a first dimension in a direction of travel of the piston, and wherein the first dimension is a function of a dimension of the body portion of the piston in the direction of travel of the piston.

3. The machine according to claim 2, wherein a ratio of the first dimension to the dimension of the body portion of the piston in the direction of travel of the piston is in a range of 1:2 to 1:1.

4. The machine according to claim 2, wherein the first dimension is a function of a dimension of an elastically deformed portion of the body portion of the piston in the direction of travel of the piston.

5. The machine according to claim 1, wherein the bearing region is defined by a second dimension in a circumferential direction of the piston.

6. The machine according to claim 5, wherein the second dimension is a function of a dimension of the body portion of the piston in the circumferential direction of the piston, and wherein a ratio of the second dimension to the dimension of the body portion of the piston in the circumferential direction of the piston is in a range of 1:4 to 1:2.

7. The machine according to claim 5, wherein the second dimension is a function of a dimension of an elastically deformed portion of the body portion of the piston in the circumferential direction of the piston.

8. The machine according to claim 1, wherein the body portion of the piston comprises a piston skirt, and wherein the bearing region is centered on a radial plane of the piston when the piston is at top dead center.

9. The machine according to claim 8, wherein the radial plane of the piston is located within a range of 10 to 20 mm from a bottom edge of the body portion of the piston, and wherein the bearing region is centered on an axial plane of the piston.

10. The machine according to claim 9, wherein the axial plane of the piston is perpendicular to the rotational axis of the piston pin, and wherein the axial plane of the piston is a mid-plane of the piston.

11. The machine according to claim 1, wherein the bearing region is centered on a point on the inner surface of the cylinder that corresponds to a grade point of the piston when the piston is at top dead center or bottom dead center.

12. The machine according to claim 1, wherein the bearing region extends partially around a circumference of the inner surface of the cylinder, wherein the bearing region extends partially along an axial length of the inner surface of the cylinder, and wherein the bearing region is elliptical.

13. The machine according to claim 1, wherein the body portion of the piston is configured to deform elastically upon engagement with the inner surface of the cylinder, a shape of the of the grade point contact zone being defined by at least one of a dimension of an elastically deformed portion of the body portion of the piston in a direction of travel of the piston and a dimension of the elastically deformed portion of the body portion of the piston in a circumferential direction of the piston.

14. The machine according to claim 1, wherein the inner surface of the cylinder comprises at least one of:

a top bearing region having one or more recesses indented into the inner surface of the cylinder, wherein the top bearing region is provided on a thrust side of the cylinder; and a bottom bearing region having one or more recesses indented into the inner surface of the cylinder, wherein the bottom bearing region is provided on an anti-thrust side of the cylinder.

15. The machine according to claim 14, wherein the top bearing region and the bottom bearing region are separated by a middle region having no recesses indented into the inner surface of the cylinder.

16. The machine according to claim 14, wherein the top bearing region and the bottom bearing region are spaced apart in a direction of travel of the piston.

17. The machine according to claim 1, wherein the one or more recesses are provided in a bore of a cylinder block or in a bore of a cylinder liner, wherein the one or more recesses are arranged into rows that extend circumferentially around the inner surface of the cylinder, the recesses of each row having a circumferential spacing between adjacent recesses, and wherein the rows are adjacent.

18. The machine according to claim 17, wherein a ratio of a dimension of the recesses in a circumferential direction to a dimension of the circumferential spacing is 2:1.

19. The machine according to claim 17, wherein one of the rows is offset from another of the rows in a circumferential direction by an offset distance, and wherein a ratio of a dimension of the recesses in the circumferential direction to a dimension of the offset distance is 2:1.

20. A method of forming a machine having one or more cylinders, wherein a grade point of a body portion of a piston of the machine periodically engages an inner surface of the cylinder during operation of the machine, the engagement defining a grade point contact zone between the inner surface of the cylinder and the body portion of the piston when the body portion of the piston rotates about an axis of a piston pin, the inner surface of the cylinder having an enhanced bearing region comprising one or more recesses indented into the inner surface of the cylinder, the enhanced bearing region being smaller than the inner surface of the cylinder, the method comprising:

determining a location of the grade point contact zone; and providing the enhanced bearing region in a region of the inner surface of the cylinder, wherein a center point of the enhanced bearing region is located in an axial plane of the piston that is perpendicular to and coincident with a midpoint of a rotational axis of the piston pin.

* * * * *